United States Patent
Kacholia et al.

(10) Patent No.: US 8,768,932 B1
(45) Date of Patent: Jul. 1, 2014

(54) METHOD AND APPARATUS FOR RANKING SEARCH RESULTS

(75) Inventors: Varun Kacholia, Mountain View, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 715 days.

(21) Appl. No.: 11/803,580

(22) Filed: May 14, 2007

(51) Int. Cl.
*G06F 7/00* (2006.01)
*G06F 17/30* (2006.01)
*G06Q 30/02* (2012.01)

(52) U.S. Cl.
CPC .... *G06F 17/30864* (2013.01); *G06F 17/30867* (2013.01); *G06F 17/30675* (2013.01); *G06Q 30/02* (2013.01); *G06F 17/30882* (2013.01)
USPC .......................... 707/748; 707/705; 707/706

(58) Field of Classification Search
CPC .................... G06F 17/30864; G06F 17/30867; G06F 17/30675; G06F 17/30882; G06Q 30/02
USPC ................................................ 707/3–5, 705
See application file for complete search history.

(56) References Cited

U.S. PATENT DOCUMENTS

| | | | | |
|---|---|---|---|---|
| 5,913,208 A * | 6/1999 | Brown et al. | ...................... | 707/3 |
| 6,029,195 A * | 2/2000 | Herz | ............................ | 725/116 |
| 6,185,558 B1 * | 2/2001 | Bowman et al. | ................ | 705/37 |
| 6,385,602 B1 * | 5/2002 | Tso et al. | ........................... | 707/3 |
| 6,499,051 B1 * | 12/2002 | Kanemitsu | .................... | 709/203 |
| 7,299,222 B1 * | 11/2007 | Hogan et al. | .......................... | 1/1 |
| 7,437,382 B2 * | 10/2008 | Zhang et al. | ................... | 707/102 |
| 7,505,964 B2 * | 3/2009 | Tong et al. | ......................... | 707/3 |
| 7,536,413 B1 * | 5/2009 | Mohan et al. | ............. | 707/103 R |
| 7,542,920 B1 * | 6/2009 | Lin-Hendel | ................... | 705/26.3 |
| RE42,262 E * | 3/2011 | Stephens, Jr. | ..................... | 707/737 |
| 7,933,818 B1 * | 4/2011 | Kumar et al. | .................... | 705/35 |
| 8,260,786 B2 * | 9/2012 | DeCoste et al. | ............. | 707/748 |
| 8,423,536 B2 * | 4/2013 | Lieske et al. | ................... | 707/722 |
| 8,484,208 B1 * | 7/2013 | Raghavan et al. | ............ | 707/728 |
| 2002/0198875 A1 * | 12/2002 | Masters | ............................ | 707/4 |
| 2003/0105682 A1 * | 6/2003 | Dicker et al. | .................... | 705/27 |
| 2003/0145277 A1 * | 7/2003 | Neal et al. | ...................... | 715/509 |
| 2003/0195877 A1 * | 10/2003 | Ford et al. | .......................... | 707/3 |
| 2004/0002973 A1 * | 1/2004 | Chaudhuri et al. | ............... | 707/7 |
| 2004/0143600 A1 * | 7/2004 | Musgrove et al. | .......... | 707/104.1 |
| 2004/0230440 A1 * | 11/2004 | Malhotra | ........................... | 705/1 |
| 2004/0254932 A1 * | 12/2004 | Gupta et al. | ....................... | 707/7 |
| 2005/0086215 A1 * | 4/2005 | Perisic | ............................... | 707/3 |
| 2005/0091245 A1 * | 4/2005 | Chickering et al. | ........... | 707/100 |
| 2005/0120006 A1 * | 6/2005 | Nye | .................................... | 707/3 |
| 2005/0165753 A1 * | 7/2005 | Chen et al. | ......................... | 707/3 |
| 2005/0256833 A1 * | 11/2005 | Zeng et al. | ......................... | 707/1 |
| 2005/0278328 A1 * | 12/2005 | Marston et al. | .................... | 707/7 |
| 2006/0004717 A1 * | 1/2006 | Ramarathnam et al. | .......... | 707/3 |

(Continued)

*Primary Examiner* — Ajay Bhatia
*Assistant Examiner* — Jessica N Le
(74) *Attorney, Agent, or Firm* — Harrity & Harrity, LLP

(57) ABSTRACT

One embodiment of the present invention provides a system for ranking search-results. During operation, the system receives a query, wherein the query includes one or more terms. The system subsequently searches a dataset using the one or more terms to obtain search-results. Next, the system receives an attribute-identifier, which identifies an attribute for the obtained search-results. Then, for each search-result, the system calculates a combined score based on an attribute-value for the identified attribute, and a relevance-score for the search-result. The system then ranks the search-results based on combined scores associated with the search-results. Finally, the system presents the ranked search-results to a user.

19 Claims, 7 Drawing Sheets

(56) References Cited

U.S. PATENT DOCUMENTS

| | | |
|---|---|---|
| 2006/0036593 A1* | 2/2006 | Dean et al. .................... 707/4 |
| 2006/0195440 A1* | 8/2006 | Burges et al. .................... 707/5 |
| 2006/0218156 A1* | 9/2006 | Schechinger et al. ........ 707/100 |
| 2006/0265400 A1* | 11/2006 | Fain et al. .................... 707/10 |
| 2007/0174257 A1* | 7/2007 | Howard .......................... 707/3 |
| 2007/0192306 A1* | 8/2007 | Papakonstantinou et al. .... 707/5 |
| 2007/0198503 A1* | 8/2007 | Hogue et al. .................. 707/5 |
| 2007/0244854 A1* | 10/2007 | Nevill-Manning et al. ....... 707/3 |
| 2007/0250488 A1* | 10/2007 | Lee ................................ 707/3 |
| 2007/0276803 A1* | 11/2007 | Shakib et al. .................. 707/3 |
| 2008/0005118 A1* | 1/2008 | Shakib et al. .................. 707/10 |
| 2008/0010264 A1* | 1/2008 | Morton et al. .................. 707/4 |
| 2008/0033915 A1* | 2/2008 | Chen et al. ...................... 707/3 |
| 2008/0033939 A1* | 2/2008 | Khandelwal .................... 707/5 |
| 2008/0077558 A1* | 3/2008 | Lawrence et al. ............... 707/3 |
| 2008/0091670 A1* | 4/2008 | Ismalon .......................... 707/5 |
| 2008/0147644 A1* | 6/2008 | Aridor et al. .................... 707/5 |
| 2008/0154878 A1* | 6/2008 | Rose et al. ...................... 707/5 |
| 2008/0215563 A1* | 9/2008 | Shi et al. ......................... 707/5 |
| 2008/0244429 A1* | 10/2008 | Stading ......................... 715/764 |
| 2008/0263026 A1* | 10/2008 | Sasturkar et al. ............... 707/5 |
| 2008/0275859 A1* | 11/2008 | Griffith ........................... 707/4 |
| 2010/0268598 A1* | 10/2010 | Musgrove et al. .......... 705/14.51 |
| 2012/0323953 A1* | 12/2012 | Ortega et al. ................. 707/767 |

* cited by examiner

DIGITAL CAMERAS – GENERIC SEARCH ENGINE – BROWSER

File Edit View Go Bookmarks Tools Help

HTTP://WWW.GENERICSEARCH.COM/SEARCH?HL=EN&LR=&Q=DIGITAL+CAMERAS&RANK=DPRICE

| DIGITAL CAMERAS | PRICE - DESCENDING ▽ — 520 | SEARCH — 530 |
|---|---|---|

| MODEL | DESCRIPTION | PRODUCT RATING | PRICE |
|---|---|---|---|
| 8) GREAT CAM Z75 | 10 MP, 8X OPTICAL ZOOM | ☆☆ | $710.00 —— 562 |
| 9) AWESOME CAMERA 6600 | 8 MP, 10X OPTICAL ZOOM | ☆☆☆☆ | $680.00 |
| 10) SUPER CAMERA MK II | 10 MP, 8X OPTICAL ZOOM | ☆☆☆☆ | $650.00 |
| 11) COOL CAM 550 | 8 MP, 6X OPTICAL ZOOM | ☆☆☆☆ | $650.00 |
| 12) SUPER CAMERA S7 | 7 MP, 6X OPTICAL ZOOM | ☆☆☆☆☆ | $550.00 |
| 13) AWESOME CAMERA 5000 | 7 MP, 6X OPTICAL ZOOM | ☆☆☆ | $540.00 |
| 14) GREAT CAM Z50 | 6 MP, 6X OPTICAL ZOOM | | $500.00 |

« ‹ PAGE 2 OF 10 › »

DIGITAL CAMERAS – GENERIC SEARCH ENGINE - BROWSER

File Edit View Go Bookmarks Tools Help

HTTP://WWW.GENERICSEARCH.COM/SEARCH?HL=EN&LR=&Q=DIGITAL+CAMERAS&RANK=DPRICE

DIGITAL CAMERAS          PRICE - ASCENDING ▽   SEARCH — 530

| MODEL | DESCRIPTION | PRODUCT RATING | PRICE |
|---|---|---|---|
| 1) CHEAP CAM 22 | 2 MP, 4X DIGITAL ZOOM | ☆ | $40.00 |
| 2) CHEAP CAM 44 | 3.2 MP, 4X DIGITAL ZOOM | ☆ ☆ | $50.00 |
| 3) TOP CAM VF1 | 4 MP, 3X OPTICAL ZOOM | ☆ ☆ ☆ | $99.00 |
| 4) COOL CAM 100 | 4 MP, 3X OPTICAL ZOOM | ☆ ☆ ☆ ☆ | $99.00 |
| 5) SUPER CAMERA MK ZI | 4 MP, 4X OPTICAL ZOOM | ☆ ☆ ☆ | $120.00 |
| 6) AWESOME CAMERA 2KR | 4 MP, 4X OPTICAL ZOOM | ☆ ☆ ☆ | $150.00 |
| 7) COOL CAM 150 | 4 MP, 4X OPTICAL ZOOM | | $155.00 |

« ‹ PAGE 1 OF 10 › »

METHOD AND APPARATUS FOR RANKING SEARCH RESULTS

BACKGROUND

1. Field of the Invention

The present invention relates to search-engines. More specifically, the present invention relates to a method and apparatus for ranking search-results produced by a search-engine.

2. Related Art

Upon receiving a query from a user, a search-engine will typically identify a set of search-results that are related to terms in the query. In most cases, the search-engine will present the search-results to a user in an ordering based on a relevance measure. However, often a user desires to rank the search-results by a specific attribute, such as price or date. To do so, the user specifies the desired attribute, and the search-engine subsequently re-ranks the search-results based on the desired attribute.

However, if the search-engine re-ranks search-results based on a desired attribute, the search-engine may list less relevant search-results before more relevant search-results. Consequently, the user may have to browse through several pages of less relevant search-results before finding more relevant search-results. This problem is often exacerbated by people who adjust a specific attribute to affect the ranking of specific search-results. For example, a merchant may reduce the price of a product by a nominal value to ensure that a search-engine lists the product first. This often causes the search-engine to list less relevant products before more relevant products.

Hence, what is needed is a method and apparatus for ranking search-results without the problems listed above.

SUMMARY

One embodiment of the present invention provides a system for ranking search-results. During operation, the system receives a query, wherein the query includes one or more terms. The system subsequently searches a dataset using the one or more terms to obtain search-results. Next, the system receives an attribute-identifier, which identifies an attribute for the obtained search-results. Then, for each search-result, the system calculates a combined score based on an attribute-value for the identified attribute, and a relevance-score for the search-result. The system then ranks the search-results based on combined scores associated with the search-results. Finally, the system presents the ranked search-results to a user.

In a variation on this embodiment, the query can include the attribute-identifier.

In a variation on this embodiment, the attribute can be: a price, a rating, an image size, an image resolution, a video length, an audio length, a text length, a file size, a date, a time, an expiration date, and a quantity.

In a variation on this embodiment, calculating the combined score can include normalizing the combined score.

In a variation on this embodiment, calculating the combined score includes applying weights to the relevance-score and the attribute-value.

In a variation on this embodiment, the system divides the ranked search-results into subsets of ranked search-results. Then, for each subset, the system re-ranks the search-results based on the attribute-value to obtain re-ranked search-results. The system then presents the re-ranked search-results to the user.

One embodiment of the present invention provides a system for ranking search-results. During operation, the system receives a query from a client at a search-engine, wherein the query includes one or more terms. The system subsequently searches a dataset using the one or more terms to obtain search-results. Next, the system receives an attribute-identifier, which identifies an attribute associated with the obtained search-results. Then, for each search-result, the system determines if the search-result has a relevance-score which is above a threshold-value. If not, the system discards the search-result. If so, the system includes the search-result in a set of relevant search-results. The system then ranks the set of relevant search-results based on an attribute-value for the identified attribute to obtain ranked relevant search-results. Finally, the system presents the ranked relevant search-results to a user.

In a variation on this embodiment, for each relevant search-result, the system calculates a combined score based on the attribute-value and the relevance-score associated with the relevant search-result. The system then ranks the relevant search-results based on combined scores associated with the relevant search-results to obtain the ranked relevant search-results.

In a variation on this embodiment, the system divides the ranked relevant search-results into subsets of ranked relevant search-results. Then, for each subset of ranked relevant search-results, the system re-ranks the search-results based on the attribute-value to obtain re-ranked relevant search-results. The system then presents the re-ranked relevant search-results to the user.

BRIEF DESCRIPTION OF THE FIGURES

FIG. 5B illustrates a second web-page in accordance with an embodiment of the present invention.

FIG. 5C illustrates a third web-page in accordance with an embodiment of the present invention.

Figure 1:
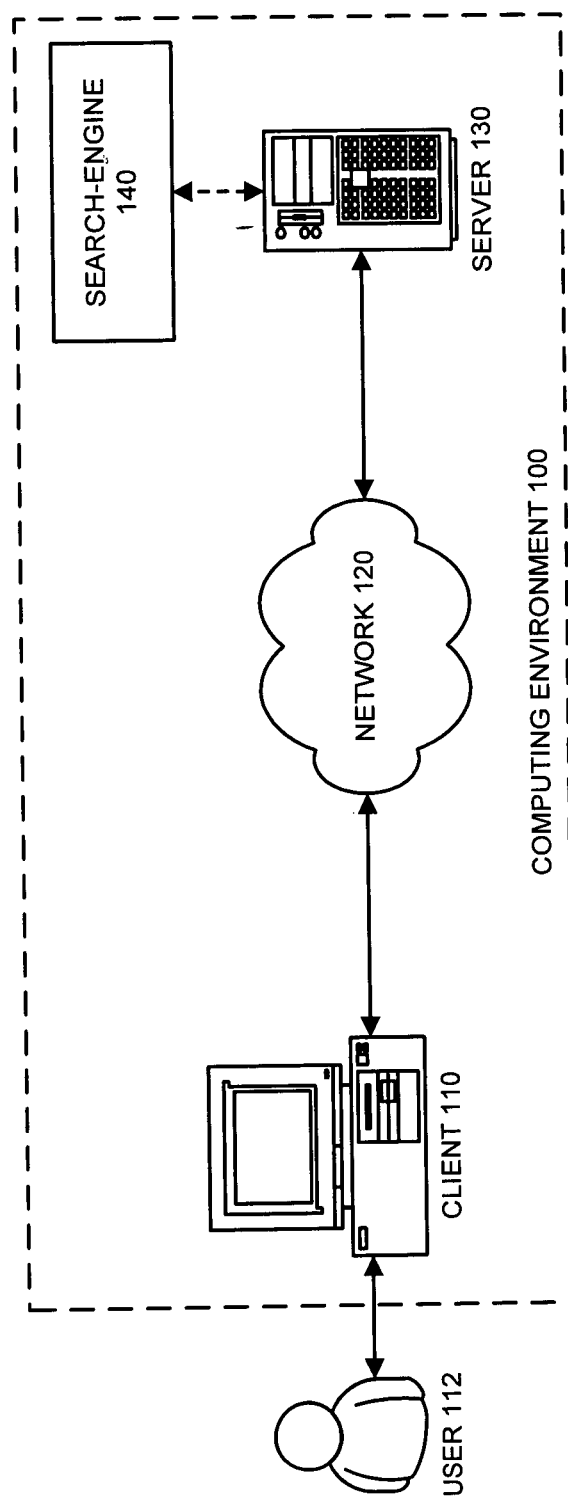
FIG. 1 illustrates a computing environment in accordance with an embodiment of the present invention.

Table 1 illustrates examples of formulas for combining an attribute-value with a relevance-score in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a search-engine that can rank search-results based on an attribute which is orthogonal to the relevancy of the search-results. Hence, for each search-result, this search-engine can calculate a combined score based on both the relevance-score of the search-result and an attribute-value associated with the search-result. The search-engine can then rank the search-results based on their combined scores and can then present the ranked search-results to a user.

In one embodiment of the present invention, the search-engine can calculate the combined score based on multiple attribute-values associated with the search-result.

In one embodiment of the present invention, the search-engine can calculate the combined score based on any orthogonal factors associated with the search-results. In this embodiment, the search-engine is not limited to using a relevance-score to calculate the combined score. For example, the search-engine could use a quality-factor in combination with an attribute-value to calculate the combined score. This quality-factor may or may not be based on the relevance of the search-result to the query, but may instead, for example, relate to the reliability of a source associated with the search-result.

In one embodiment of the present invention, by ranking the search-results by their combined score, the search-engine is able to rank search-results with a higher degree of relevancy, but a lower attribute-value above search-results with a lower-degree of relevancy, but a higher attribute-value. For example, suppose that a user searches for a digital camera and desires that the search-engine rank the search-results in ascending order of price. Note that, in this example, because the user desires to rank the search-results in ascending order of price, a low price correlates to a high attribute-value and vice-versa. Furthermore, suppose that the search-results include a camera case, which has a price that is significantly lower than any digital camera. Because the search-engine ranks the search-results based on a combined score that includes both the relevance-score and the attribute-value, the search-engine can rank, and thus present, the camera case after the digital cameras. Note that this ranking is dependent on the formula that the search-engine uses to calculate the combined score. Thus, a search-result that has a relevance-score that is only slightly higher than the relevance-score of a second search-result may still rank below the second search-result even if the second search-result is less relevant than the search-result.

In one embodiment of the present invention, after ranking the search-results based on the combined scores associated with the search-results, the search-engine can divide the search-results into subsets. During this process, the search-engine maintains the relative ranking between the search-results. The search-engine can then re-rank these subsets based on the attribute-values associated with the search-results. This enables the search-engine to fine-tune the rankings to help prevent search-results associated with a given attribute-value from ranking above search-results with a higher attribute-value. Note that the search-engine can also use this embodiment to help prevent search-results associated with a given attribute-value from ranking above search-results with a lower attribute-value, wherein the search-engine ranks search-results in ascending order based on attribute-values associated with the search-results.

In one embodiment of the present invention, before ranking the search-results, the search-engine can discard search-results associated with a relevance-score that is below a given threshold. This enables the search-engine to rank search-results based on an attribute without including search-results that have a particularly low relevance-score that can skew the rankings.

Computing Environment

FIG. 1 illustrates a computing environment 100 in accordance with an embodiment of the present invention. Computing environment 100 includes a number of computer systems, which can generally include any type of computer system based on: a microprocessor, a mainframe computer, a digital signal processor, a portable computing device, a personal organizer, a device controller, or a computational engine within an appliance. More specifically, computing environment 100 includes: client 110; network 120; server 130; and search-engine 140.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 comprises the Internet.

Server 130 can generally include any computational node including a mechanism for servicing requests from a client for computational and/or data storage resources.

Search-engine 140 can generally include any system capable of searching a dataset for an occurrence of one or more terms. Note that the dataset can include any type of data, including: images, text, video, audio, etc. Furthermore, note that search-engine 140 can comprise hardware, software, or a combination of hardware and software.

In one embodiment of the present invention, server 130 hosts search-engine 140.

In one embodiment of the present invention, client 110 hosts search-engine 140.

In one embodiment of the present invention, search-engine 140 is a stand-alone system.

User 112 can generally include: an individual; a group of individuals; an organization; a group of organizations; a computing system; a group of computing systems; or any other entity that can interact with computing environment 100.

In one embodiment of the present invention, user 112 can be a client.

A Process for Ranking Search-Results

Figure 2:
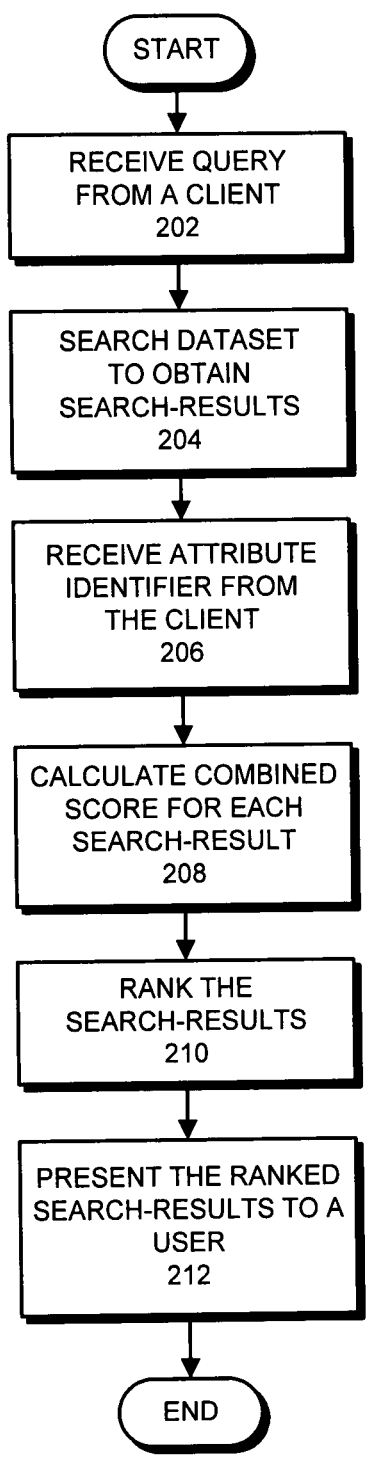
FIG. 2 presents a flow chart illustrating a process for ranking search-results in accordance with an embodiment of the present invention.

FIG. 2 presents a flow chart illustrating a process for ranking search-results in accordance with an embodiment of the present invention. The process begins when search-engine 140 receives a query from user 112 via client 110 (operation 202). Note that the query can include one or more terms that user 112 desires to search for. Search-engine 140 then searches a dataset using the one or more terms to obtain search-results (operation 204). Note that the dataset can include: web-pages, data files, video files, audio files, image files, and any other type of searchable-content. Furthermore, note that any number of clients, servers, and databases can host the dataset. Next, search-engine 140 receives an attribute-identifier from user 112 via client 110 (operation 206). Note that the attribute-identifier specifies an attribute that may be associated with the search-results. This attribute can include: a price, a rating, an image size, an image resolution, a video length, a video resolution, an audio length, an audio bit-rate, a text length, a file size, a date, a time, an expiration date, a quantity, and any other attribute that can be associated with the search-results.

In one embodiment of the present invention, the query can include the attribute-identifier.

In one embodiment of the present invention, the attribute-identifier is pre-determined. For example, search-engine 140 may be pre-configured to rank search-results by a creation-date associated with each search-result.

Then, for each search-result, search-engine 140 calculates a combined score based on an attribute-value for the identified attribute and a relevance-score for the search-result (operation 208). Note that the relevance-score can be any value that indicates how relevant a search-result is to a search. This value may be determined a priori, or may be determined during a search.

In one embodiment of the present invention, search-engine 140 can calculate the relevance-score using any method for determining a web-page quality metric, or for determining the relevancy of a search-result to a query. For example, search-engine 140 can use PageRank® to determine the relevance-score of a search-result. Generally, the PageRank technique computes and assigns a PageRank score to each web-page it encounters on the web, wherein the PageRank score serves as a measure of the relative quality of a given web-page with respect to other web-pages. PageRank generally ensures that important and high-quality web-pages receive high PageRank scores, which enables a search engine to efficiently rank the search results based on their associated PageRank scores. (see U.S. Pat. No. 6,285,999, entitled "Method for Node Ranking in a Linked Database," by inventor Lawrence Page).

In one embodiment of the present invention, the relevance-score indicates the quality of a source that provides the search-result. In this embodiment, the relevance-score may or may not indicate the quality of the search-result.

In one embodiment of the present invention, the relevance-score may be an indicator of the quality of the search-result.

In one embodiment of the present invention, search-engine 140 can use any formula for combining the attribute-value and the relevance-score. Table 1 illustrates examples of formulas for combining an attribute-value with a relevance-score in accordance with an embodiment of the present invention. The variable 'R' represents the relevance-score and the variable 'A' represents the attribute-value. Note that the attribute-value can be a value associated with an identified attribute, or a value derived from the identified attribute or multiple identified attributes. The variables '$x_1$' and '$x_2$' represent scaling factors or weights. Note that search-engine 140 is not limited to using the formulas illustrated in Table 1. Furthermore, note that search-engine 140 is not limited to using formulas that include an attribute-value, a relevance-score, and scaling factors, but can use formulas that combine any number of values associated with a search-result, search-engine 140, or a set of user-preferences. In addition, note that the attribute-value and the relevance score can be scaled using different techniques as illustrated by Formula 4.

TABLE 1

Example Formulas

| | |
|---|---|
| Formula 1 | $f(R, A) = x_1 R + x_2 A$ |
| Formula 2 | $f(R, A) = (x_1 R + x_2 A)/(x_1 + x_2)$ |
| Formula 3 | $f(R, A) = x_1 R * x_2 A$ |

TABLE 1-continued

Example Formulas

| | |
|---|---|
| Formula 4 | $f(R, A) = x_1 R + A^{x_2}$ |
| Formula 5 | $f(R, A) = R^{x_1} + A^{x_2}$ |

In one embodiment of the present invention, search-engine 140 can apply weights to the relevance-score and the attribute-value. This enables search-engine 140 to adjust the relative contributions of the relevance-score and the attribute-value to the combined score.

In one embodiment of the present invention, search-engine 140 normalizes the combined score, for example using Formula 2. (Note that normalizing the combined score can involve scaling the combined score by a reference-value). This can facilitate sorting the combined scores, which helps in ranking the search-results.

Then, after calculating the combined scores for each search-result, search-engine 140 ranks the search-results based on the combined scores (operation 210). Search-engine 140 then presents the ranked search-results to user 112 (operation 212).

Example Search

Figure 5A:
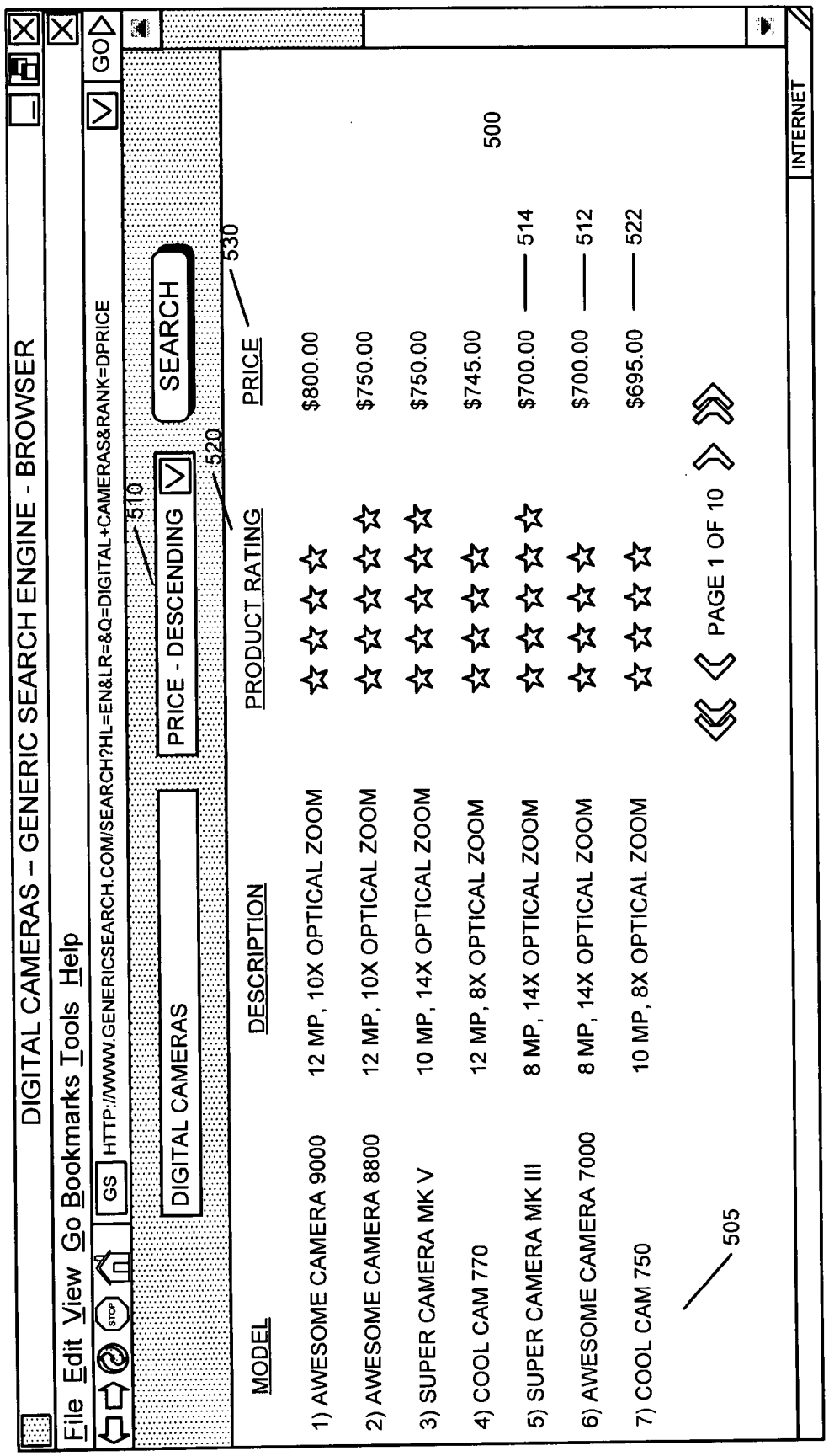
FIG. 5A illustrates a web-page in accordance with an embodiment of the present invention.

FIG. 5A illustrates a web-page 500 in accordance with an embodiment of the present invention. Web-page 500 contains search-results obtained in response to a query relating to digital cameras. More specifically, web-page 500 includes: search-results 505; ranking-type 510; product rating 520; and price 530.

Search-results 505 contains a subset of the search-results that search-engine 140 identified in response to the query.

Ranking-type 510 specifies an attribute and an order that user 112 desires search-engine 140 to use to rank search-results 505. In this example, user 112 desires search-engine 140 to rank search-results 505 in descending order by price.

Product rating 520 specifies a rating associated with each search-result. In this example, product rating 520 represents a relevance-score. Note that the relevance-score is a hidden value that search-engine 140 calculates and does not present to user 112.

In one embodiment of the present invention, search-engine 140 presents the relevance-score to user 112.

In one embodiment of the present invention, product rating 520 represents a secondary attribute, which is separate from the relevance-score. In this embodiment, search-engine 140 may or may not use product rating 520 in addition to the relevance-score and to price 530 to determine the rank of search-results 505.

In one embodiment of the present invention, search-engine 140 uses multiple attributes to rank search-results 505. In this embodiment, search-engine 140 may or may not use a relevance-score in addition to the multiple attributes to rank search-results 505.

Price 530 specifies the price associated with each search-result. Note that in this example, because user 112 selected descending order of price for ranking type 510, search-engine 140 ranks search-results 505 based on descending order of price. Furthermore, note that, because search-engine 140 uses product rating 520 as the relevance-score, search-engine 140 ranks search-results with the same price, such as search-result 514 and search-result 512, in descending order of product rating.

Ranking Subsets of Search-Results

Figure 3:
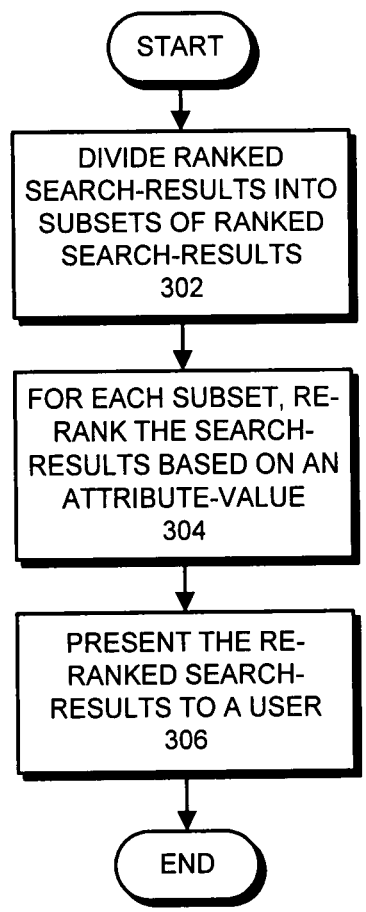
FIG. 3 presents a flow chart illustrating a process for ranking subsets of search-results in accordance with an embodiment of the present invention.

FIG. 3 presents a flow chart illustrating a process for ranking subsets of search-results in accordance with an embodiment of the present invention. Note that this process typically occurs after the completion of the process described in the previous section with respect to FIG. 2. The process begins when search-engine 140 divides the ranked search-results into subsets of ranked search-results (operation 302). Note that, when performing operation 302, search-engine 140 maintains the relative ranking of the search-results. For example, suppose that a search-result ranks above a second search-result. After search-engine 140 performs operation 302, the search-result will still rank above the second search-result. Then, for each subset, search-engine 140 re-ranks the search-results based on the attribute-value (operation 304). Search-engine 140 then presents the re-ranked search-results to user 112 (operation 306).

In one embodiment of the present invention, search-engine 140 can use this process to decrease the probability that user 112 will see a search-result associated with an attribute-value ranked above a search-result associated with a higher attribute-value.

In one embodiment of the present invention, search-engine 140 can use threshold-ranges to determine which subset of ranked search-results includes a given search-result. This embodiment can help prevent search-engine 140 from ranking a search-result which has a given relevance-score above a second search-result which has a significantly higher relevance-score regardless of the relationship between the attribute-values of the two search-results.

In one embodiment of the present invention, search-engine 140 may reshuffle search-results which are associated with a subset of search-results based on a threshold-value. This embodiment can help prevent search-engine 140 from including a search-result with a given subset of search-results that are each associated with a significantly greater or lesser relevance-score or attribute-value than the search-result.

Second Example Search

FIG. 5B illustrates a second web-page 550 in accordance with an embodiment of the present invention. Web-page 550 illustrates a second exemplary page of search-results for the same query associated with web-page 500 in FIG. 5A, wherein web-page 550 is generated after search-engine 140 executes the process described with reference to FIG. 3. In this example, each web-page represents a subset of search-results. Thus, search-results 505 represent one subset of search-results, and search-results 555 represent a second subset of search-results. Observe that search-result 562 has a higher price than several other search-results, such as search-result 522, on web-page 500. In this example, search-result 562 is included with search-results 555 because the low product rating associated with search-result 562 significantly decreases the combined attribute-value and relevance-score associated with search-result 562, and thus search-engine 140 includes search-result 562 with the second subset of search-results.

In one embodiment of the present invention, search-engine 140 does not use product rating 520 to determining ranking. In this embodiment, search-engine 140 ranks search-result 562 above search-result 514.

In one embodiment of the present invention, search-engine 140 does not divide the ranked search-results. In this embodiment, search-engine 140 ranks search-result 562 above search-result 514.

A Second Process for Ranking Search-Results

Figure 4:
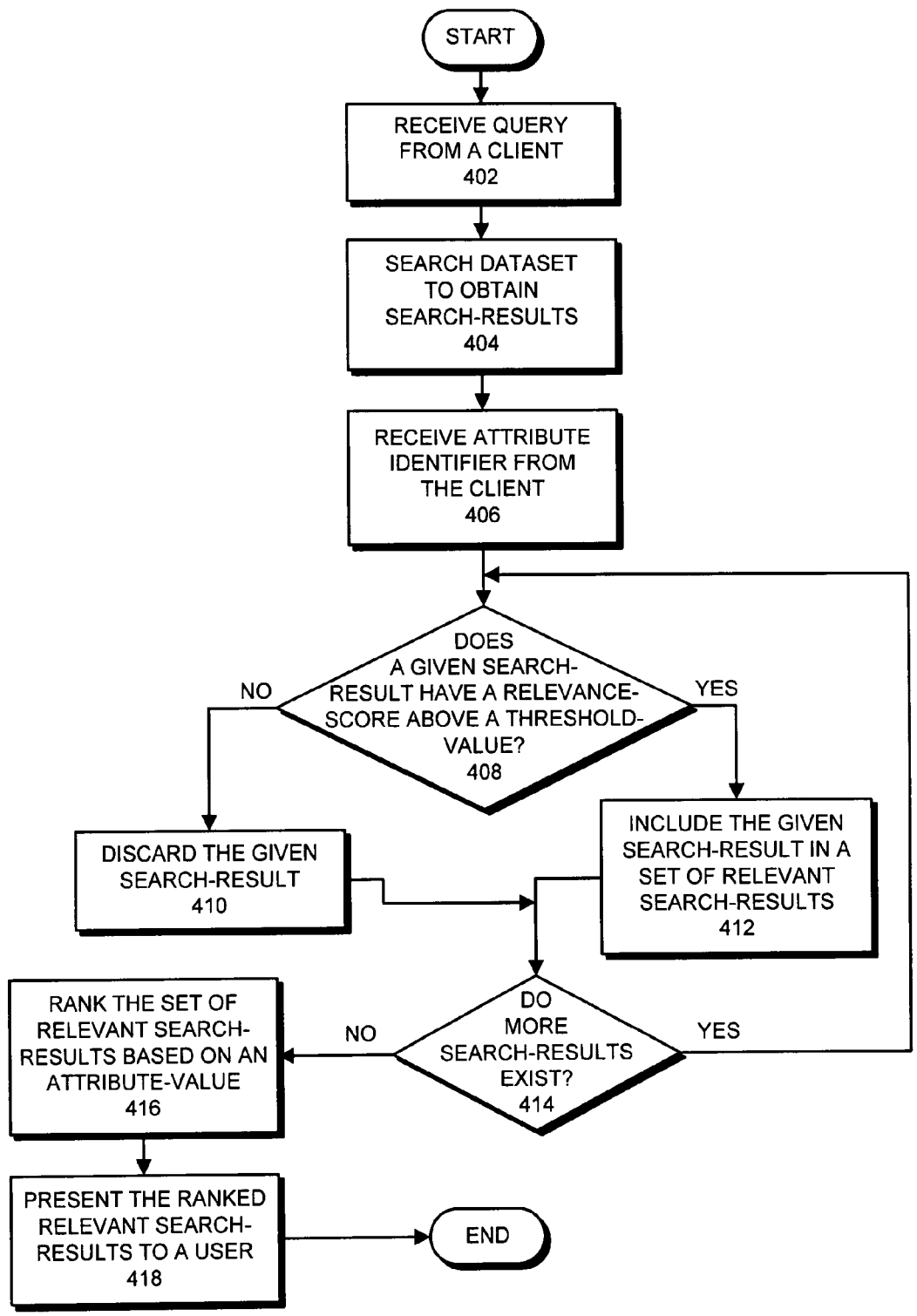
FIG. 4 presents a flow chart illustrating a second process for ranking search-results in accordance with an embodiment of the present invention.

FIG. 4 presents a flow chart illustrating a second process for ranking search-results in accordance with an embodiment of the present invention. The process begins when search-engine 140 receives a query from user 112 via client 110 (operation 402). Note that the query can include one or more terms. Search-engine 140 then searches a dataset using the one or more terms to obtain search-results (operation 404). Note that the dataset can include: web-pages; data files; video files; audio files; image files; and any other type of searchable-content. Next, search-engine 140 receives an attribute-identifier from user 112 via client 110 (operation 406). Note that the attribute-identifier specifies an attribute that may be associated with the search-results. This attribute can include: a price, a rating, an image size, an image resolution, a video length, a video resolution, an audio length, an audio bit-rate, a text length, a file size, a date, a time, an expiration date, a quantity, and any other attribute that can be associated with the search-results.

In one embodiment of the present invention, the query can include the attribute-identifier.

In one embodiment of the present invention, the attribute-identifier is pre-determined. For example, search-engine 140 may be pre-configured to rank search-results by a creation-date associated with each search-result.

Search-engine 140 then determines if a given search-result has a relevance-score above a threshold-value (operation 408). If so, search-engine 140 includes the given search-result in a set of relevant search-results (operation 412). If not, search-engine 140 discards the given search-result (operation 410).

In one embodiment of the present invention, search-engine 140 can determine the threshold-value by analyzing historical-data related to searches. This may involve analyzing all historical-data or historical-data related to searches which are similar to the query. Note that a similar search may be a search that: includes one or more terms in common with the query; includes the same attribute-identifier as the query; or shares any other feature in common with the query.

In one embodiment of the present invention, user 112 can select the threshold-value.

In one embodiment of the present invention, the threshold-value can be associated with the number of search-results for the query.

Next, search-engine 140 determines if more search-results exist (operation 414). If so, search-engine 140 returns to operation 408. If not, search-engine 140 ranks the set of relevant search-results based on an attribute-value associated with the attribute (operation 416). Search-engine 140 then presents the ranked relevant search-results to user 112 (operation 418).

In one embodiment of the present invention, discarding search-results that are not highly relevant to a query before ranking the remaining search-results helps prevent irrelevant search-results from appearing near the top of the rankings. For example, suppose that user 112 is searching for a digital camera to purchase and suppose that user 112 desires to see the search-results presented from lowest price to highest price. By first discarding irrelevant search-results, search-engine 140 does not present search-results that relate to digital cameras, but that are not currently of interest to user 112, such as search-results relating to digital camera cases.

In one embodiment of the present invention, after discarding the search-results that are not highly relevant to the query, search-engine 140 can calculate a combined score for each relevant search-result. Search-engine 140 can calculate this combined score based on a combination of the attribute-value and the relevance-score associated with the search-result. Table 1 illustrates examples of formulas for combining the attribute-value with the relevance-score in accordance with an embodiment of the present invention. Search-engine 140 can then rank the relevant search-results based on the combined scores associated with the relevant search-results.

In one embodiment of the present invention, after ranking the relevant search-results, search-engine 140 can re-rank subsets of the relevant search-results using a process similar to that described in the previous section with respect to FIG. 3.

Second Example Search

FIG. 5C illustrates a third web-page 575 in accordance with an embodiment of the present invention. Web-page 575 illustrates an exemplary page of search-results for the same query associated with web-page 500 in FIG. 5A, wherein web-page 575 is generated after search-engine 140 executes the process described with reference to FIG. 4. In this example, ranking-type 580 specifies that search-engine 140 rank the search-results in ascending order by price. Observe that web-page 575 only includes digital cameras as part of the search-results. Furthermore, observe that low-priced search-results that are not highly relevant to the "Digital Cameras" query illustrated in query-box 590, such as digital camera cases and batteries designed for digital cameras, are not included with the search-results. Note that search-engine 140 can use the process illustrated in FIG. 4 to remove the search-results which are not highly relevant to the "Digital Cameras" query.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
receiving, by one or more devices, a query that includes one or more terms;
searching, by the one or more devices, a dataset, using the one or more terms, to obtain search results;
obtaining, by the one or more devices, a user-specified attribute identifier that identifies an attribute to be used in ranking the search results,
the identified attribute being different from a measure of relevance of the search results to the query;
calculating, by the one or more devices, a combined score for each search result, included in the search results, based on the attribute value and a value corresponding to the measure of relevance of the search result to the query;
ranking, by the one or more devices, the search results based on the combined score calculated for each search result to form a first ranking of search results;
dividing, by the one or more devices and based on a threshold value associated with the measure of relevance of the search results to the query, the first ranking of search results into subsets of ranked search results,
the subsets of ranked search results including a first subset of ranked search results and a second subset of ranked search results;
ranking, by the one or more devices, search results included in the first subset of ranked search results and search results included in the second subset of ranked search results based on the attribute value to form a second ranking of search results,
each of the search results, included in the first subset of ranked search results, being ranked relative only to other ones of the search results included in the first subset of ranked search results, and
each of the search results, included in the second subset of ranked search results, being ranked relative only to other ones of the search results included in the second subset of ranked search results; and
providing, by the one or more devices, the second ranking of search results.

2. The method of claim 1, wherein the query includes the attribute identifier.

3. The method of claim 1, wherein the attribute identifier comprises one or more of:
a price;
a rating;
an image size;
an image resolution;
a video length;
an audio length;
a text length;
a file size;
a date;
a time; or
an expiration date.

4. The method claim 1, wherein calculating the combined score includes:
applying a first weight to the value corresponding to the measure of relevance, and
applying a second weight to the attribute value,
wherein the second weight is different from the first weight.

5. A method comprising:
receiving, by one or more processors, a query that includes one or more terms;
identifying, by the one or more processors and using the one or more terms, search results;
receiving, by the one or more processors, an attribute identifier, specified by a user, that identifies an attribute to be used in ranking the search results,
the identified attribute being different from a measure of relevance of the search results to the query;
calculating, by the one or more processors, a combined score for each search result, included in search results, based on an attribute value associated with the attribute and a value corresponding to the measure of relevance of the search result to the query;
ranking, by the one or more processors, the search results based on the combined score calculated for each search result to obtain first ranked search results;
dividing, by the one or more processors, the first ranked search results into a first subset of ranked search results and a second subset of ranked search results based on a threshold;
ranking, by the one or more processors, search results included in the first subset of ranked search results and search results included in the second subset of ranked search results based on the attribute value to obtain second ranked search results,
each of the search results included in the first subset of ranked search results being ranked relative only to other ones of the search results included in the first subset of ranked search results, and each of the search results included in the second subset of ranked search results being ranked relative only to other ones of the search results included in the second subset of ranked search results; and providing, by the one or more processors, the second ranked search results.

6. The method of claim 5, where calculating the combined score for each search result includes:
applying a first weight to the value corresponding to the measure of relevance, and
applying a second weight to the attribute value,
the second weight being different from the first weight.

7. A non-transitory computer-readable storage medium storing instructions, the instructions comprising:
one or more instructions which, when executed by one or more processors, cause the one or more processors to:
receive a query that includes one or more terms;
identify, using the one or more terms, search results;
determine an attribute identifier that identifies an attribute to be used in ranking the search results,
the attribute being different from a measure of relevance of the search results to the query;
calculate a combined score for each search result, included in the search results, based on an attribute value associated with the attribute and a value corresponding to the measure of relevance of the search result to the query;
rank the search results based on the combined score calculated for each search result to obtain a first ranking of search results;
divide, based on a threshold measure of relevancy, the first ranking of search results into a first subset of ranked search results and a second subset of ranked search results;
rank search results included in the first subset of ranked search results and search results included in the second subset of ranked search results based on the attribute value to obtain a second ranking of search results,
each of the search results included in the first subset of ranked search results being ranked relative only to other ones of the search results included in the first subset of ranked search results, and
each of the search results included in the second subset of ranked search results being ranked relative only to other ones of the search results included in the second subset of ranked search results; and
provide the second ranking of search results.

8. The non-transitory computer-readable storage medium of claim 7, wherein the query includes the attribute identifier.

9. The non-transitory computer-readable storage medium of claim 7, wherein the attribute identifier includes one or more of:
a price;
a rating;
an image size;
an image resolution;
a video length;
an audio length;
a text length;
a file size;
a date;
a time; or
an expiration date.

10. The non-transitory computer-readable storage medium of claim 7, wherein the one or more instructions to calculate the combined score include:
one or more instructions to apply a first weight to the value corresponding to the measure of relevance, and
one or more instructions to apply a second weight to the attribute value,
wherein the second weight is different from the first weight.

11. A non-transitory computer-readable storage medium storing instructions, the instructions comprising:
one or more instructions which, when executed by one or more processors, cause the one or more processors to:
receive a query that includes one or more terms;
identify, using the one or more terms, search results;
determine an attribute identifier that identifies an attribute to be used in ranking the search results,
the attribute being different from a measure of relevance of the search results to the query;
calculate a combined score for each search result, included in the search results, based on the measure of relevance of the search result to the query and the attribute;
rank the search results based on the combined score calculated for each search result to obtain first ranked search results;
divide, based on a threshold measure of relevancy, the first ranked search results into a first subset of the first ranked search results and a second subset of the first ranked search results;
rank search results included in the first subset of the ranked search results and search results included in the second subset of the ranked search results based on the attribute to obtain second ranked search results,
each of the search results included in the first subset of the ranked search results being ranked relative only to other ones of the search results included in the first subset of the ranked search results, and
each of the search results included in the second subset of the ranked search results being ranked relative only to other ones of the search results included in the second subset of the ranked search results; and
provide the second ranked search results.

12. The non-transitory computer-readable storage medium of claim 11, wherein the one or more instructions to calculate the combined score for each search result include:
one or more instructions to calculate the combined score for each search result based on a value for the attribute and a value corresponding to the measure of relevance of the search result to the query.

13. The non-transitory computer-readable storage medium of claim 12, where the one or more instructions to calculate the combined score for each search result further include:
one or more instructions to apply a first weight to the value corresponding to the measure of relevance, and
one or more instructions to apply a second weight to the attribute value,
the second weight being different from the first weight.

14. A device comprising:
a processor to:
receive a query that includes one or more terms;
identify, using the one or more terms, search results;
receive an attribute identifier, that is specified by a user, to identify an attribute for ranking the search results,
the identified attribute being different from a measure of relevance of the search results to the query;
calculate a combined score for each search result, included in the search results, based on an attribute value associated with the attribute and the measure of relevance of the search result to the query;

rank the search results based on the combined score calculated for search result to obtain a first ranking of the search results;

divide, based on a threshold value associated with the measure of relevance of the search results to the query, the first ranking of the search results into a first subset of the first ranking of the search results and a second subset of the first ranking of the search results;

rank search results included in the first subset of the first ranking of the search results and search results included in the second subset of the first ranking of the search results based on the attribute value to obtain a second ranking of the search results,
- each of the search results included in the first subset of the first ranking of the search results being ranked relative only to other ones of the search results included in the first subset of the first ranking of the search results, and
- each of the search results included in the second subset of the first ranking of the search results being ranked relative only to other ones of the search results included in the second subset of the first ranking of the search results; and provide the second ranking of the search results.

15. The device of claim 14, where, when calculating the combined score for each search result, the processor is to:
calculate the combined score for each search result based on the attribute value and a value corresponding to the measure of relevance of the search result to the query.

16. The device of claim 15, wherein, when calculating the combined score for each search result, the processor is further to:
apply a first weight to the value corresponding to the measure of relevance, and
apply a second weight to the attribute value,
wherein the second weight is different from the first weight.

17. A system comprising:
a device to:
receive a query that includes one or more terms;
identify, using the one or more terms, a plurality of search results;

determine an attribute identifier, specified by a user, that identifies an attribute used to rank the plurality of search results,
the identified attribute being different from a measure of relevance of the plurality of search results to the query;

calculate a combined score for each search result, included in the plurality of search results, based on the attribute and the measure of relevance of the search result to the query;

rank the search results based on the combined score calculated for each search result to obtain a first ranking of the plurality of search results;

divide, based on a threshold value associated with the measure of relevance of the plurality of search results to the query, the first ranking of the plurality of search results into a first subset of ranked search results and a second subset of ranked search results;

rank search results included in the first subset of ranked search results and the search results included in the second subset of ranked search results based on an attribute value associated with the attribute to obtain a second ranking of the plurality of search results,
- each of the search results included in the first subset of ranked search results being ranked relative only to other ones of the search results included in the first subset of ranked search results, and
- each of the search results included in the second subset of ranked search results being ranked relative only to other ones of the search results included in the second subset of ranked search results; and provide the second ranking of the plurality of search results.

18. The system of claim 17, wherein, when calculating the combined score for each search result, the device is to:
calculate a combined score for each search result based on the attribute value and a value corresponding to the measure of relevance of the search result to the query.

19. The system of claim 18, where, when calculating the combined score for each search result, the device is further to:
apply a first weight to the value corresponding to the measure of relevance, and
apply a second weight to the attribute value,
the second weight being different from the first weight.

* * * * *